(12) United States Patent
Kashiwagi

(10) Patent No.: US 7,314,232 B2
(45) Date of Patent: Jan. 1, 2008

(54) DRIVER LEG RESTRAINT APPARATUS

(75) Inventor: Daisuke Kashiwagi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/510,723

(22) Filed: Aug. 28, 2006

(65) Prior Publication Data

US 2007/0045998 A1    Mar. 1, 2007

(30) Foreign Application Priority Data

Aug. 30, 2005   (JP) .............................. 2005-249659

(51) Int. Cl.
*B60R 21/16* (2006.01)

(52) U.S. Cl. ................................. 280/730.1; 280/743.1

(58) Field of Classification Search ............. 280/730.1, 280/730.2, 743.1, 732

See application file for complete search history.

(56) References Cited

U.S. PATENT DOCUMENTS

| | | | |
|---|---|---|---|
| 5,797,621 A | | 8/1998 | Ono |
| 6,942,245 B2 * | | 9/2005 | Takimoto et al. ........ 280/730.1 |
| 7,182,365 B2 * | | 2/2007 | Takimoto et al. ........ 280/730.1 |
| 7,213,834 B2 * | | 5/2007 | Mizuno et al. ........... 280/730.1 |
| 2004/0164527 A1 | | 8/2004 | Nagata et al. |
| 2004/0207183 A1 | | 10/2004 | Nagata et al. |
| 2004/0262896 A1 | | 12/2004 | Mizuno et al. |
| 2005/0151352 A1 | | 7/2005 | Abe et al. |
| 2006/0071459 A1 * | | 4/2006 | Hayakawa et al. ....... 280/730.1 |

FOREIGN PATENT DOCUMENTS

| | | |
|---|---|---|
| EP | 1 555 168 A1 | 7/2005 |
| JP | H10-166977 | 6/1998 |
| JP | H11-091488 | 4/1999 |
| JP | 2005-193819 | 7/2005 |
| WO | WO 2004065178 A1 * | 8/2004 |

* cited by examiner

*Primary Examiner*—Paul N. Dickson
*Assistant Examiner*—Joseph Rocca
(74) *Attorney, Agent, or Firm*—Manabu Kanesaka

(57) ABSTRACT

A driver leg restraint apparatus is disposed on a lower side of a steering column. The driver leg restraint apparatus includes an airbag upwardly inflatable in a vicinity of a lower surface of a steering column cover, and a protection cloth attached to the airbag for covering a top part of the airbag opposite to a car key device when the airbag is inflated. In the inflated condition, the protection cloth is positioned on the top part of the airbag to have a space between the protection cloth and the top part of the airbag.

6 Claims, 3 Drawing Sheets

DRIVER LEG RESTRAINT APPARATUS

BACKGROUND OF THE INVENTION AND RELATED ART STATEMENT

The present invention relates to a driver leg restraint apparatus for restraining driver's legs in a car crash, and particularly to a leg restraint apparatus of a driver in a driver's seat.

A knee airbag apparatus for restraining the driver's legs in a car crash is provided in a lower side of a steering column in a car. In a car crash, a gas generator discharges the gas, which is supplied to the airbag. Then the airbag is inflated and deployed between an interior panel and the driver's legs, whereby both driver legs are restricted.

In Japanese Unexamined Application Publication No. 2004-284416, in order to prevent the damage caused when a key inserted into a key cylinder of the steering column cover or a key holder thereof directly contacts an airbag during inflation, a protection cloth (referred to as reinforcing cloth 53 in the same publication) is provided on an external surface of the air bag to prevent the airbag from damaging.

The object of the present invention is to improve the protection characteristic of an airbag by means of a protection cloth in a driver leg restraint apparatus having the protection cloth, for protecting the airbag inflated and deployed in a lower side of a steering column (steering column cover) from a key holder and such.

SUMMARY OF THE INVENTION

In a first aspect of the invention, a driver leg restraint apparatus of the present invention which is disposed on a lower side of a steering column includes an airbag upwardly inflatable in a vicinity of the lower surface of a steering column cover, and a protection cloth that covers a part opposite to a car key device when the airbag is inflated. When the airbag is inflated, the protection cloth is positioned on an upper side of a top part of the airbag, and a space exists between the protection cloth and the top part of the airbag.

In a second aspect of the driver leg restraint apparatus, one side of the protection cloth is coupled to a surface of an instrument panel side in the airbag side and the other side thereof is coupled to a surface of a driver side in the airbag of the first aspect.

In a driver leg restraint apparatus of the present invention, if an airbag is upwardly inflated in a vicinity of a lower surface of a steering column cover, a protection cloth disposed at an upper side of a top part of this airbag is opposed to a key device. In case when a key holder and the like is dangling from the key device, this protection cloth will come in first contact with the key holder. Since a space exists between this protection cloth and a top part of the airbag, if the key holder contacts this protection cloth, the protection cloth is drawn into this space, thereby absorbing the impact from the key holder and the like. As a result, the impact applied to the airbag from the key holder is alleviated or settled.

In accordance with the second aspect, one side of this protection cloth is coupled to an instrument panel side of the airbag and the other side thereof is coupled to a driver side of the airbag, whereby the posture of this protection cloth is stabilized.

DETAILED DESCRIPTION OF PREFERRED EMBODIMENTS

Figure 1:
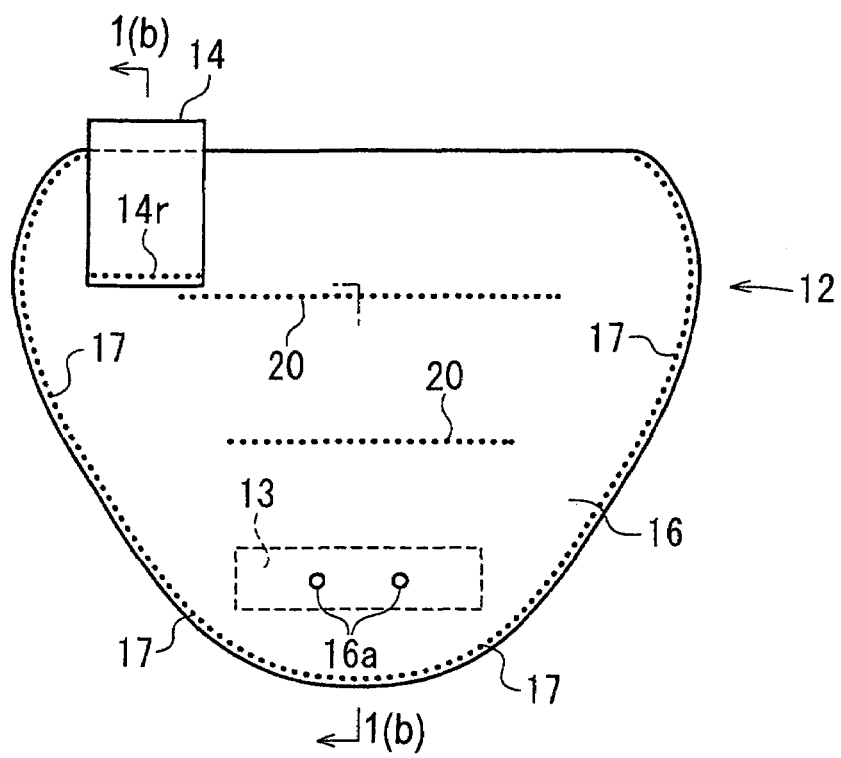
FIG. 1(a) is a front view of an airbag of a driver leg restraint apparatus according to an embodiment of the present invention.
FIG. 1(b) is a cross-sectional view taken along line 1(b)-1(b) shown in FIG. 1(a).
Figure 1:
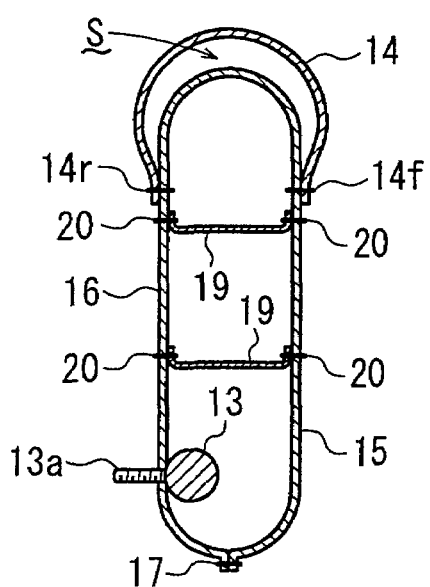
Figure 2:
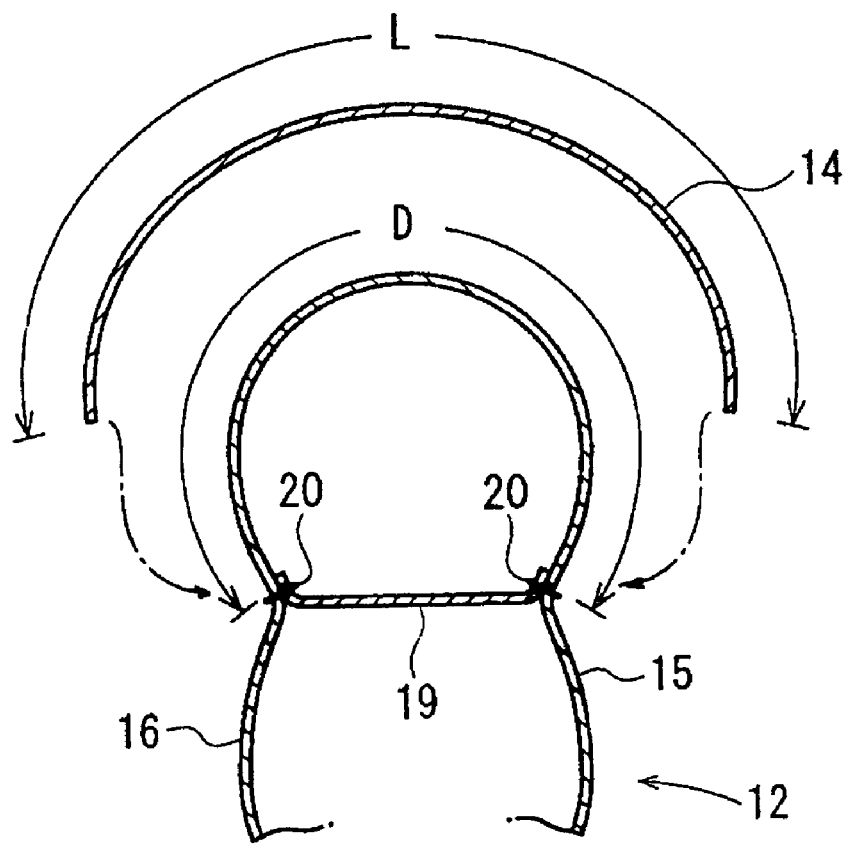
FIG. 2 is an exploded view of the airbag and protection cloth shown in FIG. 1.
Figure 3:
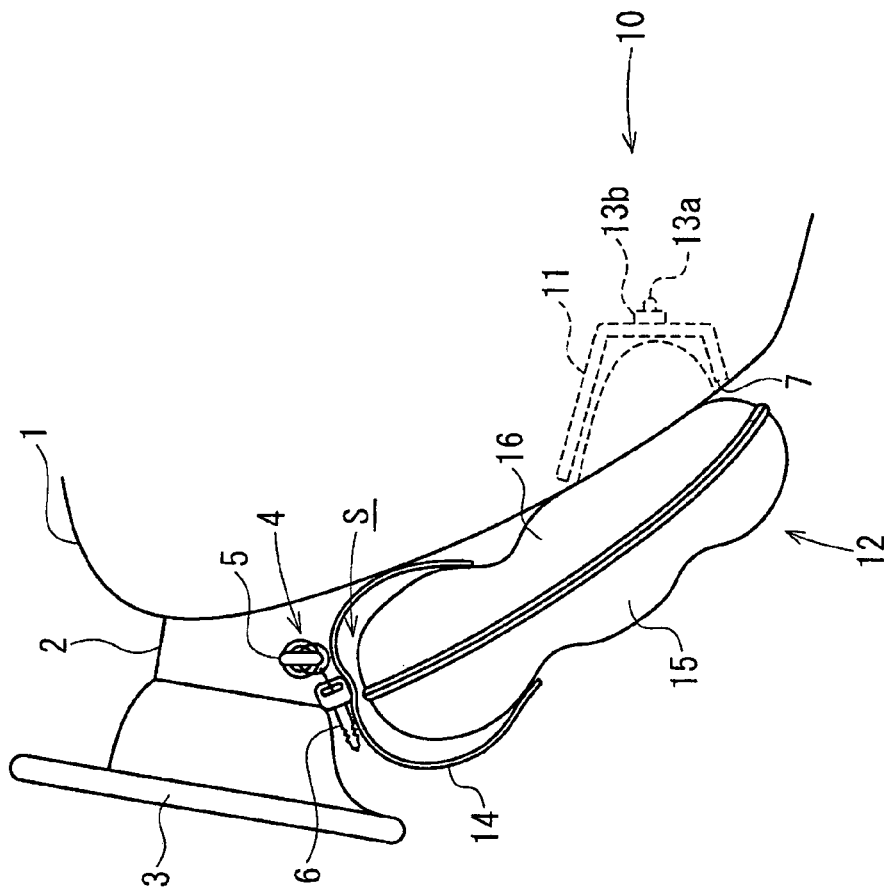
FIG. 3 is a side view of a front side of a car driver's seat when the airbag shown in FIG. 1 is inflated.

Hereinafter, the embodiments of the present invention will be described with reference to the drawings. FIG. 1(a) is a front view of an airbag of a driver leg restraint apparatus in accordance with the embodiment of the present invention, FIG. 1(b) is a cross-sectional view taken along line 1(b)-1(b) in FIG. 1(a). FIG. 2 is an exploded view of the airbag and protection cloth. FIG. 3 is a side view of a front side of a driver's seat in a car when this airbag inflates. Moreover, left and right directions represent a width direction of a car body in the description below.

As shown in FIG. 3, a steering column (not shown) is protruded from the instrument panel 1 on the front of the drive's seat in the car and the steering column is surrounded by the steering column cover 2. A steering wheel 3 is fixed to a steering shaft (not shown) protruded from the steering column.

In this embodiment, a key device (key cylinder) 4 is provided on a right surface of the steering cover 2 (a right surface viewed from a driver of the driver's seat). The key holder 6 is mounted in dangled shape on a key 5 that is inserted into the key device 4. (The key 5 is shown as a separate key in FIG. 3. Hereinafter, this key holder may be referred to as an attachment key.) This attachment key 6 is dangled down to a side lower than a lower surface of the steering column cover 2 under a normal state (in a state not contacting a protection cloth 14 described below).

A driver leg restraint apparatus 10 is provided on a lower side of this steering column cover 2.

This driver leg restraint apparatus 10 has a vessel-shaped case 11 having an aperture 7 on a front surface (a surface of the driver side), a cover for covering the aperture (not shown), an airbag 12 connected to the case 11 and a gas generator 13 for inflating the airbag 12.

The case 11 is disposed within an aperture (not shown) for the airbag provided in a region lower than the steering column cover 2 at the instrument panel 1. Generally, the airbag 12 is folded and housed within the case 11 and a lid (not shown) is mounted on a front aperture of the case 11 to cover the folding body of this airbag 12. When the airbag 12 is inflated, the lid is opened by a pressure of the airbag 12, whereby the aperture for the airbag is opened.

The airbag 12 is inflated by a gas from the gas generator 13, expands up toward the front side of the instrument panel 1 through the aperture for the airbag. Then, the airbag 12 deploys along the lower surface of the steering column cover 2 from a region on a side lower than the steering column cover 2 of the instrument panel 1, thereby extending to the top from the bottom, as shown in FIG. 3.

In this embodiment, as shown in FIG. 1(a), the airbag 12 becomes wider in the left and right width (width in width direction of car body) from a lower part to an upper part and the left and right width of this airbag 12 is larger than that of the steering column cover 2.

When this airbag is inflated along a vicinity of the lower surface of the steering column cover 2, the center part of the left and right directions on the top part of the airbag 12 is opposed to the lower surface of the steering column cover 2. The left portion and right portion thereof are laterally wider than the left portion and right portion of the steering column cover 2. That is, in this embodiment, if the airbag 12 is inflated, the right surface thereof is opposed to the said key device 4 from a lower side.

Further, these left and right sides correspond to the left and right sides when the airbag 12 is viewed from the driver side. These left and right sides are reversed when the airbag 12 is viewed from the side opposite to the driver side in FIG. 1(a). Hereinafter, the left and right directions correspond to the left and right directions viewed from the driver side.

The airbag 12 has a front surface 15 on the driver side and a rear surface 16 on the instrument panel 1. In this embodiment, one sheet of panel is folded in two, of which one side thereof constitutes the front surface 15 and the other side thereof constitutes the rear surface 16. The periphery portions of the overlapped front surface 15 and rear surface 16 are stitched to each other, whereby the airbag 12 is manufactured. Reference numeral 17 represents a seam of this stitching.

The protection cloth 14 is mounted on this airbag 12 to cover the right portion of the top part thereof when the airbag 12 is inflated.

In this embodiment, the protection cloth 14 is constructed by a strip-shaped panel as a separate panel from the panel constituting an outer shell (front surface 15 and rear surface 16) of this air bag 12. The upper side of the airbag 12 is partly covered from the instrument panel side to the driver side by this protection cloth 14. One longitudinal side is stitched and attached to the top part of the rear surface 16, and the other side is stitched and attached to the top part of the front surface 15. Reference numeral 14f represents a seam of stitching of this protection cloth 14 to the front surface 15. Reference numeral 14r represents a seam of suture of this protection cloth 14 to the rear surface 16.

As shown in FIG. 2, the length L of this strip-shaped protection cloth 14 is larger than the distance D extending to a coupling portion (seam portion 14f) between the protection cloth 14 and front surface 15 passing through the upper part of the airbag 12 from a coupling portion (seam portion 14r) between this protection cloth 14 and rear surface 16 along the external surface of the inflated airbag 12. As a result, when the airbag is fully inflated, the protection cloth 14 remains loose so that a space S may be formed between the protection cloth 14 and the top part of the airbag 12 (the protection cloth 14 may substantially contact the top part of the airbag 12).

Further, in the present invention, it is preferable that the length L of this strip-shaped protection cloth 14 is 200 to 500 mm, and particularly, 280 to 380 mm. In addition, the length L thereof is larger than the distance D described above by 5 to 100 mm, particularly, approximately 10 to 60 mm.

In addition, it is preferable that the coupling portion (seam portion 14r) between the protection cloth 14 and rear surface 16 is positioned in the lower side apart from the upper surface of the rear surface 16 by 50 to 200 mm, particularly, 120 to 170 mm when the air bag 12 is flattened. Further, it is preferable that the coupling portion (seam portion 14f) between the protection cloth 14 and front surface 15 is positioned in the lower side apart from the upper part of the front surface 15 by 50 to 200 mm, particularly, 120 to 170 mm when the air bag is flattened.

It is preferable that the left-right-direction width of this protection cloth 14 is 10 to 250 mm, particularly, 100 to 150 mm.

A special limitation is not limited to the material of this protection cloth 14, but it is suitable that the constituent material thereof is the same as the constituent material of the airbag 12.

In this embodiment, as shown in FIG. 1(b), a tether 19 for restricting the inflation thickness of the airbag 12 is provided by connecting the front surface 15 and rear surface 16 to the inside of the airbag 12. Reference numeral 20 represents seams that stitch, in the thickness direction of the airbag, the tether 19 to the front surface 15 and the rear surface 16, respectively. In this embodiment, the tether 19 extends continuously in the left and right directions, and several tethers are provided to be spaced apart from each other in the vertical directions (two tethers in this embodiment). Both portions in the left and right directions are spaced apart from the left and right sides of the airbag 12 and a ventilation space is formed in-between.

A gas generator 13 is disposed within this air bag 12. A stud bolt 13a is protruded from this gas generator 13 or a holder (not shown) holding the same. When these stud bolts 13a are inserted into inserting holes 16a formed adjacent to the lower part of the rear surface 16 and inserting holes (not shown) formed on the rear surface of the case 11, respectively, these stud bolts 13a are fastened with nuts 13b, whereby the gas generator 13 and the lower part of the rear surface 16 are fixed to the case 11.

Afterwards, this airbag 12 is folded and housed within the case 11, on which the lid is mounted, whereby the driver leg restraint apparatus 10 is constructed.

In a case that a car having the driver leg restraint apparatus 10 constructed as shown above is crashed, the gas generator 13 performs the gas discharge, whereby the airbag 12 starts inflating. First, this airbag 12 pushes and opens the lid, and begins to inflate toward the front surface of the instrument panel 1 through the aperture 7 for the airbag. Then, the airbag deploys upwardly along the front surface of the instrument panel 1.

As shown in FIG. 3, in this driver leg restraint apparatus 10, if the airbag 12 is inflated up to a vicinity of the lower surface of the steering column cover 2, the protection cloth 14 is opposed to the key device 4 from the lower side. As shown in FIG. 3, since the space S exists between this protection cloth 14 and the outer surface of the upper end part of the airbag 12, when the attachment key 6 contacts the protection cloth 14, the protection cloth 14 is drawn into this space S, thereby absorbing the impact applied to the airbag 12 from the attachment key 6. Consequently, the impact applied to the airbag 12 from the attachment key 6 is alleviated or settled.

The above-referenced embodiment shows an example of the present invention, and the invention is not confined only to the construction shown.

For example, the shape of the protection cloth is not confined only to the strip shape, but may have different shapes such as a bag shape surrounding the top part of the airbag.

In the above-referenced embodiment, both sides of the protection cloth are coupled directly to the front surface and rear surface of the airbag by the stitching, respectively, but the connection may be carried out through a connecting member (for example, a dangling string).

The construction of the steering peripheral member and the airbag may be left and right reversed to the above-referenced embodiment.

The disclosure of Japanese Patent Application No. 2005-249659 filed on Aug. 30, 2005 is incorporated herein as a reference.

What is claimed is:

1. A driver leg restraint apparatus disposed on a lower side of a steering column, comprising:

an airbag upwardly inflatable in a vicinity of a lower surface of a steering column cover; and a protection cloth attached to the airbag for covering a top part of the airbag opposite to a car key device when the airbag is inflated, the protection cloth having one side coupled to an instrument panel side of the airbag and the other side coupled to a driver side of the airbag without connecting to the top part of the airbag, wherein the protection cloth is configured not to be torn or detached when the airbag is inflated and has a length greater than a length of the airbag from a rear coupling portion between the protection cloth and the instrument panel side of the airbag to a front coupling portion between the protection cloth and the driver side of the airbag through the top part so that when the airbag is fully inflated, the protection cloth is positioned on the top part of the airbag to form a space between the protection cloth and the top part of the airbag, said space absorbing an impact applied to the protection cloth by the car key to thereby protect the airbag.

2. A driver leg restraint apparatus according to claim 1, wherein the protection cloth has a lateral width less than half of a lateral length of an upper part of the airbag.

3. A driver leg restraint apparatus according to claim 1, wherein the length of the protection cloth is from 200 to 500 mm.

4. A driver leg restraint apparatus according to claim 3, wherein the length of the protection cloth is from 280 to 380 mm.

5. A driver leg restraint apparatus according to claim 1, wherein the length of the protection cloth is 5 to 100 mm greater than the length of the airbag between the rear and front coupling portions.

6. A driver leg restraint apparatus according to claim 5, wherein the length of the protection cloth is 10 to 60 mm greater than the length of the airbag between rear and front coupling portions.

* * * * *